US011880945B2

(12) United States Patent
Shiffman

(10) Patent No.: US 11,880,945 B2
(45) Date of Patent: Jan. 23, 2024

(54) SYSTEM AND METHOD FOR POPULATING A VIRTUAL CROWD IN REAL TIME USING AUGMENTED AND VIRTUAL REALITY

(71) Applicant: SILVER SPOON ANIMATION INC., New York, NY (US)

(72) Inventor: Rotem Shiffman, Brooklyn, NY (US)

(73) Assignee: SILVER SPOON ANIMATION INC., New York, NY (US)

(*) Notice: Subject to any disclaimer, the term of this patent is extended or adjusted under 35 U.S.C. 154(b) by 65 days.

(21) Appl. No.: 17/385,169

(22) Filed: Jul. 26, 2021

(65) Prior Publication Data
US 2022/0028173 A1    Jan. 27, 2022

Related U.S. Application Data

(60) Provisional application No. 63/056,555, filed on Jul. 25, 2020.

(51) Int. Cl.
*G06T 19/00* (2011.01)
*G06F 3/04847* (2022.01)
*G06F 3/04815* (2022.01)

(52) U.S. Cl.
CPC ........ *G06T 19/006* (2013.01); *G06F 3/04815* (2013.01); *G06F 3/04847* (2013.01); *G06T 2200/24* (2013.01)

(58) Field of Classification Search
CPC ... G06T 19/006; G06T 2200/24; G06T 13/40; G06F 3/04815; G06F 3/04847; G06F 3/0484; G06F 3/011; H04N 21/21805; H04N 21/23418; H04N 21/2187; H04N 21/816
See application file for complete search history.

(56) References Cited

U.S. PATENT DOCUMENTS

| 10,218,762 | B2 | 2/2019 | Leuth | |
|---|---|---|---|---|
| 2010/0091036 | A1* | 4/2010 | Wright | H04N 5/272 345/633 |
| 2011/0225039 | A1* | 9/2011 | Goldman | G06Q 30/02 715/757 |

(Continued)

FOREIGN PATENT DOCUMENTS

| CN | 103310478 | 9/2013 |
|---|---|---|
| CN | 105208430 | 12/2015 |

(Continued)

OTHER PUBLICATIONS

O'Dwyer, Danny, "The 12th Man", FIFA 2014 Review, published at https://www.gamespot.com/reviews/fifa-2014-review/1900-6415568/ as of Sep. 23, 2013, including video "FIFA 14 Next-Gen Video Review" (Year: 2013).*

(Continued)

*Primary Examiner* — William A Beutel
(74) *Attorney, Agent, or Firm* — Gearhart Law, LLC; David Postolski

(57) ABSTRACT

The present disclosure describes a software-based solution for rendering digital crowds in real-time. The system at large is a network of machines that processes and ingests broadcast camera feeds and tracking data and then leverages an augmented reality system for compositing and tracking platforms to render tens of thousands of crowd members on top of live footage.

18 Claims, 12 Drawing Sheets

(56) References Cited

U.S. PATENT DOCUMENTS

| | | | | |
|---|---|---|---|---|
| 2011/0234631 A1* | 9/2011 | Kim | ............... | G06T 15/60 |
| | | | | 345/632 |
| 2015/0262406 A1* | 9/2015 | Jeon | ............... | G06T 19/006 |
| | | | | 345/420 |
| 2015/0279113 A1 | 10/2015 | Knorr et al. | | |
| 2017/0171614 A1* | 6/2017 | el Kaliouby | ......... | H04N 21/233 |
| 2019/0035149 A1 | 1/2019 | Chen et al. | | |
| 2020/0404219 A1* | 12/2020 | Yerli | ............... | G06T 19/006 |
| 2022/0062773 A1* | 3/2022 | Eder | ............... | G06T 13/80 |

FOREIGN PATENT DOCUMENTS

| | | |
|---|---|---|
| CN | 105263038 | 1/2016 |
| CN | 109727519 | 5/2019 |
| CN | 110446091 | 11/2019 |
| EP | 2911049 | 8/2015 |

OTHER PUBLICATIONS

TurboSquid ("Stadium With Audience (+ card stunt)", published at https://www.turbosquid.com/3d-models/max-stadium-audience-card-stunt/697607 and archived at archive.org as of Jun. 1, 2013) (Year: 2013).*

* cited by examiner

SYSTEM AND METHOD FOR POPULATING A VIRTUAL CROWD IN REAL TIME USING AUGMENTED AND VIRTUAL REALITY

CROSS-REFERENCE TO RELATED APPLICATIONS SECTION

This application is a U.S. Non-Provisional Patent Application that claims priority to U.S. Provisional Patent Application Ser. No. 63/056,555 filed on Jul. 25, 2020, the entire contents of which are hereby incorporated by reference in their entirety.

FIELD OF THE EMBODIMENTS

The present invention relates generally to virtual reality (VR) and augmented reality (AR) in the field of virtual audiences for a live event where audience members are populated into a venue and through motion capture in order to provide real-time and meaningful audience attendance.

BACKGROUND OF THE EMBODIMENTS

In times of pandemic or in times where crowds cannot gather but leisure, entertainment and sports activities must persevere and continue on, a system and method for devising a virtual crowd is needed. The participants in the event, whether they are the viewers, the audience, the actual performers, or players that the audience has come to see, all need to feel as if they were experiencing the event as if all parties were actually present in the venue.

Related Art Includes

European Patent No. EP2911049B1 teaches a method, a system, and a computer-readable recording medium for generating a crowd animation. The method includes: (a) generating a guide shape of a crowd including one or more characters by referencing a first user operation, where the guide shape defines the formation and/or the number of the one or more characters included in the crowd; (b) generating a guide path for defining a motion path of the one or more characters included in the crowd by referencing a second user operation, which is inputted with respect to the guide shape; and (c) generating the crowd animation in which the one or more characters included in the crowd move along the motion path that is defined by the guide path in the formation defined by the guide shape.

U.S. Published Patent Application No. 2019/0035149 A1 discloses a method of generating an image file of a personalized 3D head model of a user. The method includes: (i) acquiring at least one 2D image of the user's face; (ii) performing automated face 2D landmark recognition based on the at least one 2D image of the user's face; (iii) providing a 3D face geometry reconstruction using a shape prior; (iv) providing texture map generation and interpolation with respect to the 3D face geometry reconstruction to generate a personalized 3D head model of the user, and (v) generating an image file of the personalized 3D head model of the user.

U.S. Pat. No. 10,218,762 B2 describes entertainment services, live performances, virtual events/locations, and/or live events. In particular, the disclosure relates to systems and methods to provide a real-time digital impact virtual audience.

Chinese Patent Publication No. CN105263038B and Chinese Patent Publication No. CN105208430A describe a method and an apparatus for dynamic display of a virtual auditorium. The method includes: generating the virtual auditorium comprising a plurality of virtual seats; displaying the virtual auditorium; displaying a head portrait of a virtual audience member at each virtual seat; setting movement tracks with a same distance for the head portrait of each virtual audience member; and enabling the head portrait of each of the virtual audience member to start to move according to respective movement tracks from different starting times.

U.S. Published Patent Application No. 2015/0279113 A1 teaches a method and system of representing a virtual object in a view of a real environment. The method includes providing image information of a first image of at least part of a human face captured by a camera, providing at least one human face specific characteristic, determining an image area of the face in the first image as a face region, determining at least one first light falling on the face according to the face region and the at least one human face specific characteristic, and blending in the virtual object on a display device in the view of the real environment according to at least one first light. The method further includes: providing a plurality of face sample positions, providing for each of the plurality of face sample positions a radiance transfer function, determining image positions of the face sample positions in the first image, and determining a first light according to intensity information associated with the image positions of the face sample positions in the first image and the radiance transfer functions associated with the face sample positions in the first image.

Chinese Patent Publication No. CN109727519A describes a large-scale virtual crowd simulation system. Chinese Patent Publication No. CN110446091A teaches a virtual audience display method, a system, a device and a storage medium. Chinese Patent Publication No. CN103310478B discloses a method to generate diversified virtual crowds.

None of the prior art teaches a system and method for populating a virtual crowd in real-time using AR and VR, where the actions of the users in the virtual crowd are based on motion capture.

SUMMARY OF THE EMBODIMENTS

The present invention and its embodiments relate to VR and AR in the field of virtual audiences for a live event, where audience members are populated into a venue and through motion capture in order to provide real-time and meaningful audience attendance.

A first embodiment of the present invention describes a system for rendering virtual or digital crowds in real-time. The system includes numerous components, such as, but not limited to, a computing device, an augmented reality system, and render machines. The computing device includes at least an application, a memory, a storage device, and a graphical user interface (GUI).

The application of the computing device is configured to: map a venue of a first location hosting an event in a three-dimensional (3D) view. The venue may be a stadium or a sporting arena. It should be appreciated that the venue is not expressly limited to the examples provided herein. In some examples, the mapping of the venue in the 3D view occurs via a light detection and ranging (LiDar) remote sensing method. However, it should be appreciated that the mapping is not limited to such method and other methods known to those having ordinary skill in the art are contemplated. The application of the computing device is further configured to: receive data from one or more cameras in a second location. The data comprises tracking data of one or more users in the second location. Next, the application of the computing device is configured to: process the data and transmit the processed data to an augmented reality system.

The augmented reality system is configured to receive the processed data and combine the processed data with additional data to form digital crowd members. The digital crowd members comprise a first set of fans of a first team, a second set of fans of a second team, and a third set of fans of neither the first team nor the second team. The first team and the second team are associated with the event being held at the venue.

The augmented reality system is further configured to place/populate the digital crowd members into the 3D view of the venue on top of live footage occurring in the venue. In some examples, the augmented reality system is further configured to utilize a geographically accurate sunlight simulation system to illuminate the digital crowd members based on the geo-coordinates of the venue and a current date and time. More specifically, the augmented reality system is configured to place the digital crowd members into the 3D view of the venue by: dividing the venue into sections, tagging each of the sections to create positions (e.g., seats in the venue) in which the digital crowd members can be spawned into, and replicating each of the sections in a 3D environment to create the 3D view.

An operator may engage the GUI of the computing device to modify or manipulate aspects of the system. For example, the operator may engage the GUI of the computing device to modify a geometry of the venue in the 3D view to match the geometry of the physical venue. Since the digital crowd members comprise factors customizable by the operator, the operator is configured to engage the GUI of the computing device to manipulate the digital crowd members. Such factors include, but are not limited to: clothing of the digital crowd members, logos on the clothing of the digital crowd members, skin color of the digital crowd members, skin tone of the digital crowd members, gender of the digital crowd members, hair styles of the digital crowd members, hair length of the digital crowd members, hair color of the digital crowd members, height of the digital crowd members, animations associated with the digital crowd members, a ratio of fans associated with a first team as compared to a second team of the digital crowd members, a percentage of empty seats in the venue associated with the first location, and/or a gender ratio of the digital crowd members, among others. In some examples, the animations for each of the digital crowd members may include: a sitting animation, a standing animation, a cheering animation, a booing animation, or a watching animation, among others not explicitly listed herein.

The operator may also engage the GUI of the computing device to respond to an event in the venue in real-time. Such response may include: a customization of one or more animations for one or more of the digital crowd members, a customization of lighting for the venue, a customization of a weather event for the venue, a card stunt for one or more of the digital crowd members, and/or a movement for one or more of the digital crowd members, among others not explicitly listed herein.

Further, a transmission control protocol (TCP) network is configured to propagate commands of the operator to render machines in real-time.

A second embodiment of the present invention describes a method executed by a system for rendering virtual or digital crowds in real-time. The method includes numerous process steps, such as, but not limited to: mapping, via a processor of a computing device and via a light detection and ranging (LiDar) remote sensing method, a venue of a first location hosting an event in a three-dimensional (3D) view. In illustrative examples, the venue may include a stadium or a sporting arena. The method then includes: receiving, by the processor, data from one or more cameras in a second location. The data comprises tracking data of one or more users in the second location. Next, the method includes: processing, by the processor, the data and transmitting the processed data to an augmented reality system.

Then, the method includes: receiving, by the augmented reality system, the processed data, combining the processed data with additional data to form digital crowd members, and placing the digital crowd members into the 3D view of the venue. The digital crowd members are populated into the 3D view of the venue on top of live footage occurring in the venue. More specifically, the digital crowd members are placed into the 3D view of the venue by: dividing the venue into sections, tagging each of the sections to create positions (e.g., seats in the venue) in which the digital crowd members can be spawned into, and replicating each of the sections in a 3D environment to create the 3D view. In some examples, the augmented reality system may use a geographically accurate sunlight simulation system to illuminate the digital crowd members based on the geo-coordinates of the venue and a current date and time.

Next, the method includes allowing an operator to engage the GUI of the computing device to manipulate the digital crowd members. Such manipulation of the digital crowd members may include: customizing one or more factors of one or more of the digital crowd members. Such factors include, but are not limited to: clothing of the digital crowd members, logos on the clothing of the digital crowd members, skin color of the digital crowd members, skin tone of the digital crowd members, gender of the digital crowd members, hair styles of the digital crowd members, hair length of the digital crowd members, hair color of the digital crowd members, height of the digital crowd members, animations associated with the digital crowd members, a ratio of fans associated with a first team as compared to a second team of the digital crowd members, a percentage of empty seats in the venue associated with the first location, and/or a gender ratio of the digital crowd members, among others. In some examples, the animations for each of the digital crowd members may include: a sitting animation, a standing animation, a cheering animation, a booing animation, or a watching animation, among others.

The method may additionally include: propagating, by the TCP network, commands of the operator to render machines in real-time.

A third embodiment of the present invention describes a computer system. The computer system includes one or more processors, one or more memories, and one or more computer-readable hardware storage devices. The one or more computer-readable hardware storage devices contain program code executable by the one or more processors via the one or more memories to implement a method for rendering virtual or digital crowds in real-time. The method includes numerous process steps, such as, but not limited to: mapping, via a light detection and ranging (LiDar) remote sensing method, a venue of a first location hosting an event in a three-dimensional (3D) view. In examples, the venue comprises a stadium or a sporting arena.

The method also includes: receiving data from one or more cameras in a second location, where the data comprises tracking data of one or more users in the second location.

Next, the method includes: processing the data and transmitting the processed data to an augmented reality system. Then, the method includes the augmented reality system receiving the processed data, combining the processed data with additional data to form digital crowd members, and placing the digital crowd members into the 3D view of the venue.

Next, the method includes allowing an operator to engage the GUI to manipulate the digital crowd members. Further, the method includes propagating, by the TCP network, commands of the operator to render machines in real-time.

DESCRIPTION OF THE PREFERRED EMBODIMENTS

Figure 1:
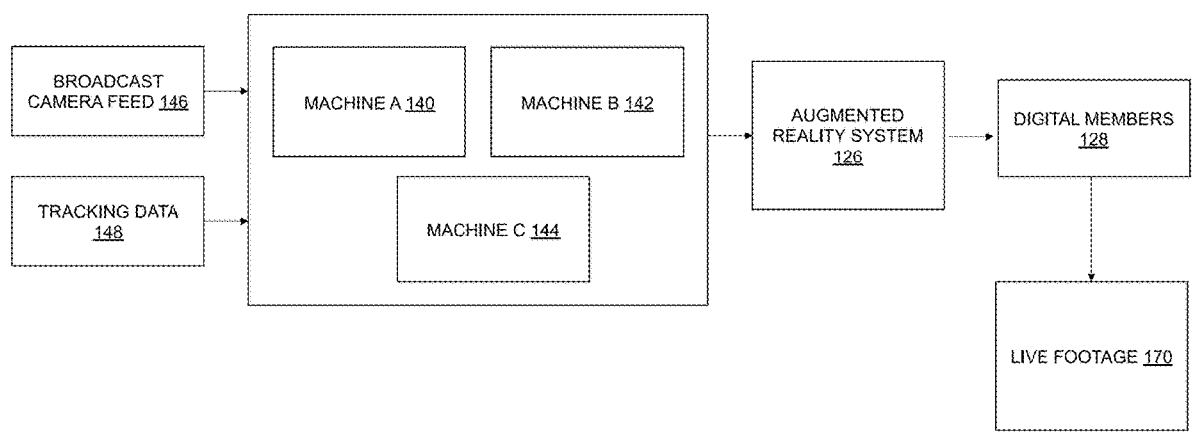
FIG. 1 depicts a generalized block diagram of a system, according to at least some embodiments disclosed herein.

The preferred embodiments of the present invention will now be described with reference to the drawings. Identical elements in the various figures are identified with the same reference numerals. Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

The present invention and its embodiments relate to VR and AR in the field of virtual audiences for a live event, where audience members are populated into a venue and through motion capture in order to provide real-time and meaningful audience attendance.

As described herein, "AR" is an interactive experience of a real-world environment where the objects that reside in the real world are enhanced by computer-generated perceptual information, sometimes across multiple sensory modalities, including visual, auditory, haptic, somatosensory and olfactory. AR can be defined as a system that incorporates three basic features: a combination of real and virtual worlds, real-time interaction, and accurate 3D registration of virtual and real objects. The overlaid sensory information can be constructive (i.e. additive to the natural environment), or destructive (i.e. masking of the natural environment). This experience is seamlessly interwoven with the physical world such that it is perceived as an immersive aspect of the real environment. In this way, augmented reality alters one's ongoing perception of a real-world environment.

AR is used by the instant system to enhance fan engagement, which boosts fan loyalty, and results in future willingness of fans to spend money on fan-specific products. AR attracts younger fans in particular, whose seemingly diminishing attention spans demand innovative presentation modalities.

In addition to AR, the system described herein also utilizes VR. VR is a simulated experience that can be similar to or completely different from the real world. Applications of virtual reality include entertainment (e.g. video games), education (e.g. medical or military training) and business (e.g. virtual meetings).

FIG. 1 depicts a generalized block diagram of a system, according to at least some embodiments disclosed herein. As shown in FIG. 1, the system described herein generally includes a software-based solution for rendering digital crowds in real-time. The system at large is a network of machines (e.g., a machine A 140, a machine B 142, and/or a machine C 144, among others) that process and ingests broadcast camera feed 146 and tracking data 148 and then leverages an augmented reality system 126 for compositing and tracking platforms to render tens of thousands of crowd members (e.g., digital members 128) on top of live footage 170 for an event, such as a sporting event.

Figure 2:
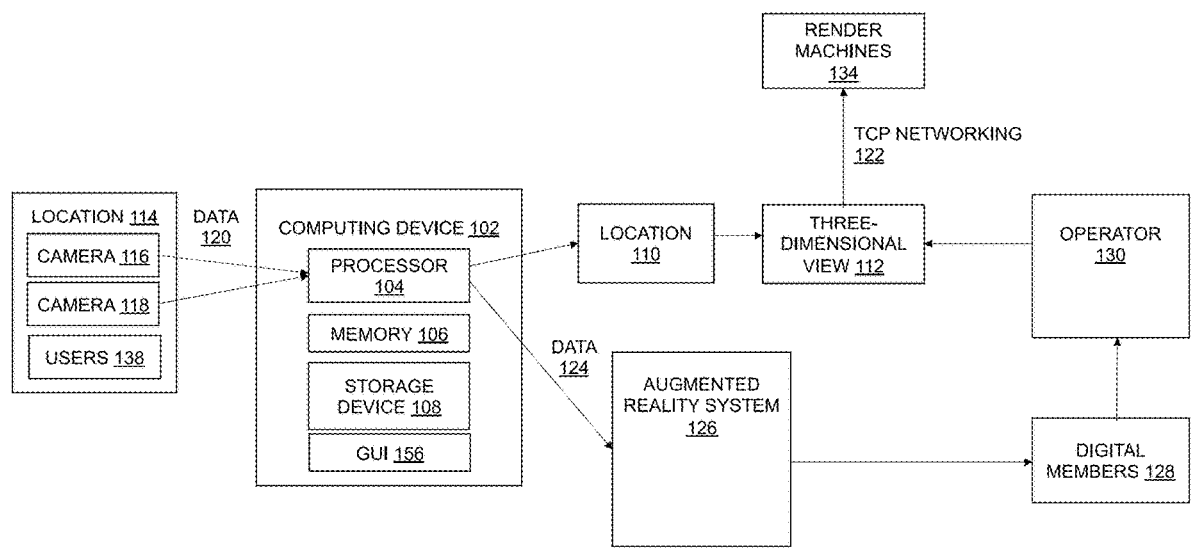
FIG. 2 depicts another block diagram of a system, according to at least some embodiments disclosed herein.
Figure 3:
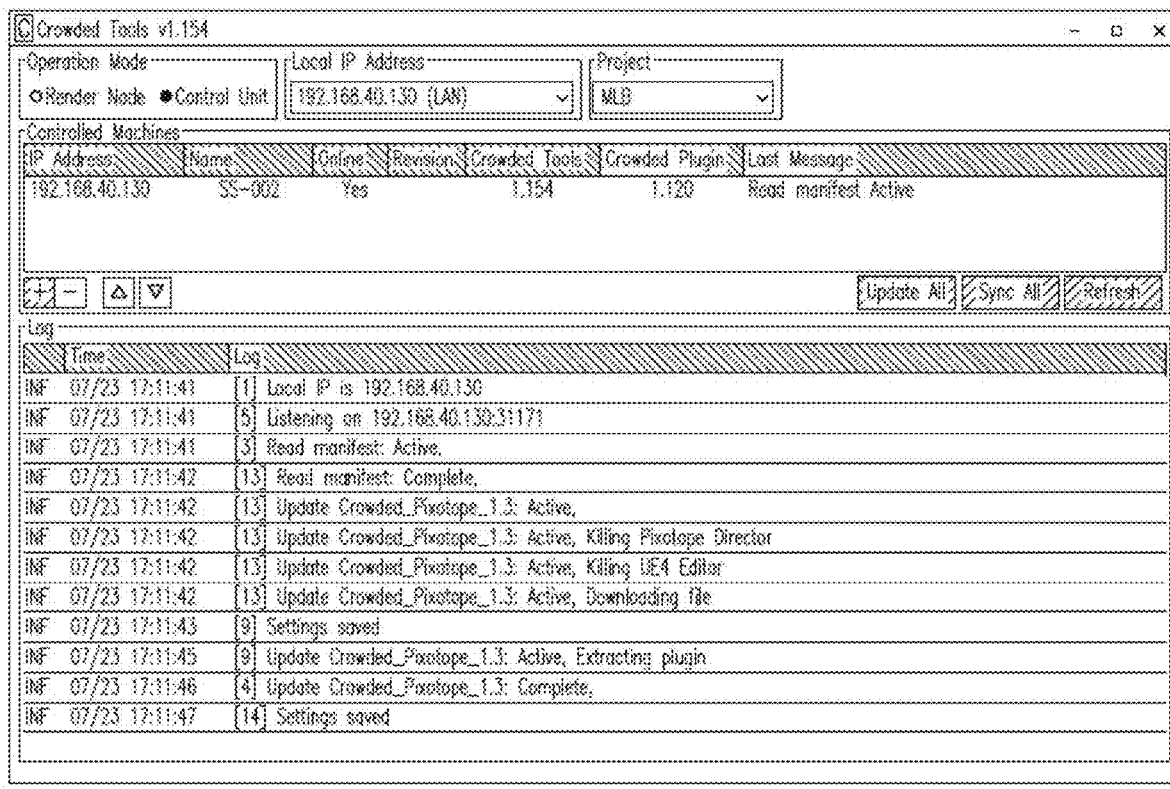
FIG. 3 depicts an illustration of a preferred embodiment, according to at least some embodiments disclosed herein.

FIG. 2 depicts another block diagram of a system, according to at least some embodiments disclosed herein. FIG. 3 depicts an illustration of a preferred embodiment, according to at least some embodiments disclosed herein.

The system of FIG. 2 includes numerous components, such as, but not limited to, a computing device 102, an augmented reality system 126, and render machines 134. The computing device 102 includes one or more processors 104, one or more memories 106, one or more storage devices 108, and a graphical user interface (GUI) 156. It should be appreciated that the one or more computer-readable hardware storage devices 108 contain program code executable by the one or more processors 104 via the one or more memories 106 to implement the method described herein. The computing device 102 may be a computer, a laptop computer, a smartphone, and/or a tablet, among other examples not explicitly listed herein. Further, the process steps performed by the one or more processors 104 may alternatively be performed by an engine, an application, a software program, a service, or a software platform.

In some examples, the one or more processors 104 may comprise an ancillary standalone software that is used for updating engine plugins and project versions across all local networked machines. In this example, each machine has tools installed on it and is set up either as a render node or a control unit accordingly. Each machine's local IP address is set in tools as well as which project is being operated and should be updated. All render nodes act as slaves to the master control unit, where the control unit can perform the actions of the crowded machine across all machines on the network and monitor each machine's status. The tools can sync the latest updates of the project and can update the plugin across all machines.

As shown in FIG. 2, the one or more processors 104 (or an application 220 of FIG. 10) of the computing device 102 is configured to: map a venue of a first location 110 hosting an event in a three-dimensional (3D) 112. The venue is a stadium or a sporting arena. In some examples, the mapping of the venue in the 3D view 112 occurs via a light detection and ranging (LiDar) remote sensing method. However, it should be appreciated that the mapping is not limited to such method and other methods known to those having ordinary skill in the art are contemplated.

The one or more processors 104 (or the application 220) of the computing device 102 are further configured to: receive data 120 from one or more cameras (e.g., a camera 116 and a camera 118) in a second location 114. Though two cameras are depicted, it should be appreciated that any quantity of the one or more cameras may be used. The data 120 comprises tracking data of one or more users 138 in the second location 114. In specific examples, the one or more cameras (e.g., the camera 116 and the camera 118) are motion capture cameras and the data 120 comprises movement data, such as sitting, standing, cheering, booing, etc. Next, the one or more processors 104 (or the application 220) of the computing device 102 are configured to: process the data 120 to form processed data 124 and transmit the processed data 124 to an augmented reality system 126.

The augmented reality system 126 is configured to receive the processed data 124 and combine the processed data 124 with additional data to form digital crowd members 128. The digital crowd members 128 comprise a first set of fans of a first team, a second set of fans of a second team, and a third set of fans of neither the first time nor the second team. The first team and the second team are associated with the event being held at the venue of the first location 110.

Each of the first set of fans, the second set of fans, and the third set of fans has metadata consisting of color gradients and logos that are used to populate the crowd/the digital crowd members 128 with the proper fan color clothing and logos. Character models are imported without colors assigned and color gradients are used to set all of the variations in skin color tone, hair color, and clothing in order to make a diverse crowd and mitigate repetitiveness. In order to render tens of thousands of fans (e.g., the digital crowd members 128) in real time, a level-of-detail algorithm processes and ingests the processed data 124 and the additional data to dynamically switch between different versions of fan models based on their size on the screen.

It should be appreciated that as described herein, a level of detail (LOD) algorithm is used in computer graphics and refers to the complexity of a 3D model representation. LOD can be decreased as the model moves away from the viewer or according to other metrics such as object importance, viewpoint-relative speed or position. LOD techniques increase the efficiency of rendering by decreasing the workload on graphics pipeline stages, usually vertex transformations. The reduced visual quality of the model is often unnoticed because of the small effect on object appearance when distant or moving fast.

The augmented reality system 126 is further configured to place/populate the digital crowd members 128 into the 3D view 112 of venue on top of the live footage 170 occurring in the venue of the first location 110.

Figure 5:
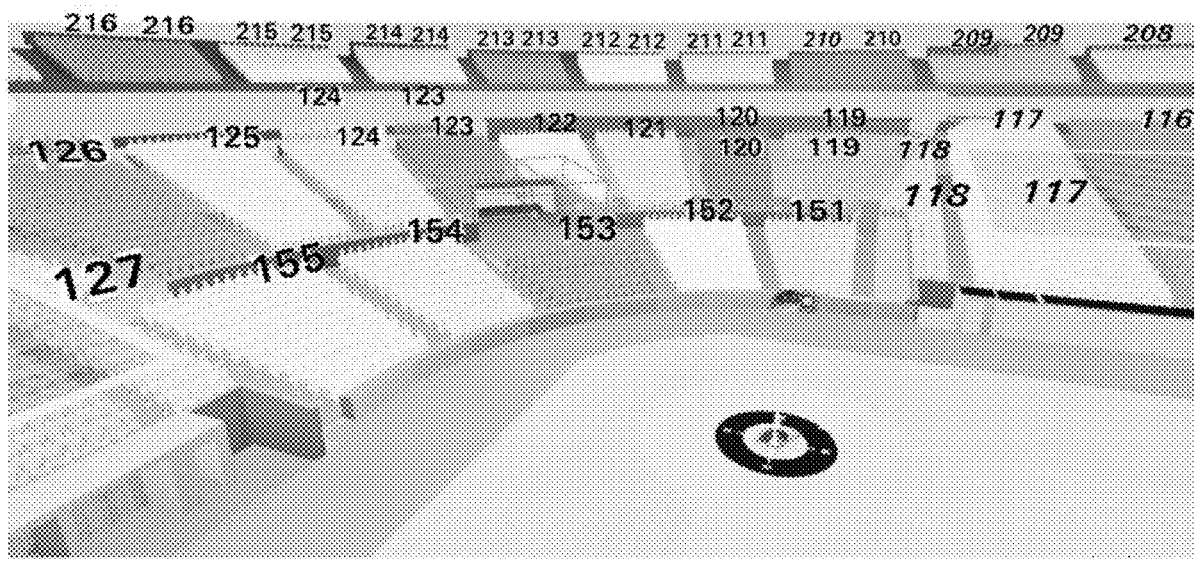
FIG. 5 depicts a representative screen of venue tagging tools of a system, according to at least some embodiments disclosed herein.

FIG. 5 depicts a representative screen of venue tagging tools of a system, according to at least some embodiments disclosed herein. More specifically, the augmented reality system 126 is configured to place the digital crowd members 128 into the 3D view 112 of the venue by: dividing the venue into sections, tagging each of the sections to create positions (e.g., seats in the venue) in which the digital crowd members 128 can be spawned into, and replicating each of the sections in a 3D environment to create the 3D view 112.

Venue sections are placed using section placing modes, such as: grid, quad and spline. Each of the section modes places one section at a time and can be configured to have a specific number of rows, a specific distance between rows, a specific distance between seats, and specific row offsets. The quad section mode has four moveable corners which can be adjusted to match the real venue section geometry, and the spline section can place rows with a curve to match venue sections that have an arch. Each section has the option of turning on trace culling, which will eliminate any seat that does not have venue geometry beneath it. Another method of eliminating unwanted seats includes using a venue culling volume, a box which can be placed anywhere in the section and will eliminate the seats that fall within the volume.

In some examples, the augmented reality system 126 is further configured to utilize a geographically accurate sunlight simulation system to illuminate the digital crowd members 128 based on the geo-coordinates of the venue (at the first location 110) and a current date and time.

Figure 4:
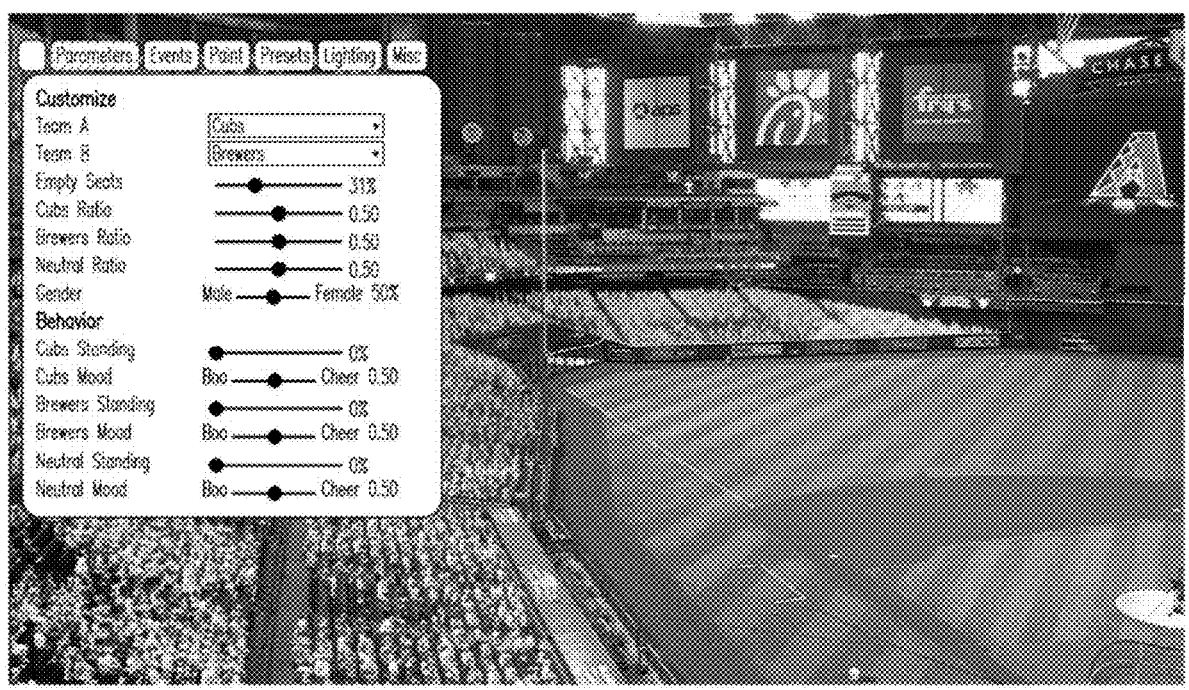
FIG. 4 depicts a representative view of operator tools of a system, according to at least some embodiments disclosed herein.

FIG. 4 depicts a representative view of the operator tools of a system, according to at least some embodiments disclosed herein. An operator or user of the system 130 may engage operator tools via the GUI 156 of the computing device 102 to respond to the sporting event or game in real-time. The GUI 156 has controls that are used to customize the crowd look, behavior, and venue lighting. Additionally, the GUI 156 has controls that are used to trigger events such as card stunts, crowd waves, and custom AR elements.

As a first illustrative example, the operator 130 may also modify a geometry of the venue in the 3D view to match the geometry of the physical venue. Moreover, the operator 130 may control the behavior of the crowd (e.g., the digital crowd members 128) in real-time based on the events and actions taking place in the venue. Since the digital crowd members 128 comprise factors customizable by the operator 130, the operator 130 is configured to engage the GUI 156 of the computing device 102 to manipulate the digital crowd members 128. Such factors include, but are not limited to: clothing of the digital crowd members 128, logos on the clothing of the digital crowd members 128, skin color of the digital crowd members 128, skin tone of the digital crowd members 128, gender of the digital crowd members 128, hair styles of the digital crowd members 128, hair length of the digital crowd members 128, hair color of the digital crowd members 128, height of the digital crowd members 128, animations associated with the digital crowd members 128, a ratio of fans associated with the first team as compared to the second team of the digital crowd members 128, a percentage of empty seats in the venue associated with the first location 110, and/or a gender ratio of the digital crowd members 128, among others. In some examples, the animations for each of the digital crowd members 128 may include: a sitting animation, a standing animation, a cheering animation, a booing animation, or a watching animation, among others for the digital crowd members 128.

Events which can be triggered are reactions such as home run and minor cheers for each team, card stunts and waves. The operator 130 may also engage the GUI 156 of the computing device 102 to respond to an event in the venue in real-time. Such response may include: a customization of one or more animations for one or more of the digital crowd members 128, a customization of lighting for the venue at the first location 110 (e.g., if the venue has a roof, if there are shadows on the crowd, etc.), a customization of a weather event for the venue at the first location 110 (e.g., sun, fog intensity, etc.), a card stunt for one or more of the digital crowd members 128, and/or a movement for one or more of the digital crowd members 128, among others not explicitly listed herein.

As described herein, a card stunt consists of a preset section of the crowds which, once triggered, all hold up cards that come together to form a surface where an image or video can be played on. The system also provides for crowd waves to be displayed. As described herein, a crowd wave may be preset at different locations throughout the venue and may have button triggers on the GUI 156 to set each one off, along with a parameter to control the intensity of the wave.

The operator 130 also has the ability to paint several of these parameters directly onto the crowd of the digital members 128 using a virtual brush. This paint brush can paint in empty seats, chairs, teams, and brightness. Several debugging options are also toggleable by the operator 130 through the GUI 156 to monitor frames per second (FPS), performance, and show the venue's proxy geometry. All of these customizations can easily be saved as a preset and loaded at a later time.

In another embodiment of the present invention, the system allows the operator 130 to customize the crowd based on season appropriate attire, synchronized crowd behavior (e.g. high fives), dynamic head movement (e.g. fan looking at the camera when it's pointed at them), people walking in the aisles, and props (e.g. foam fingers, banners).

Further, a transmission control protocol (TCP) network 122 is configured to propagate commands of the operator 130 to render machines 134 in real-time. A quantity of the render machines 134 is not limited to any particular quantity. As described herein, TCP refers to an Internet protocol that connects a server and a client. Together, TCP and Internet Protocol (IP) are the set of networking protocols that enable computers to connect over the Internet.

Figure 6:
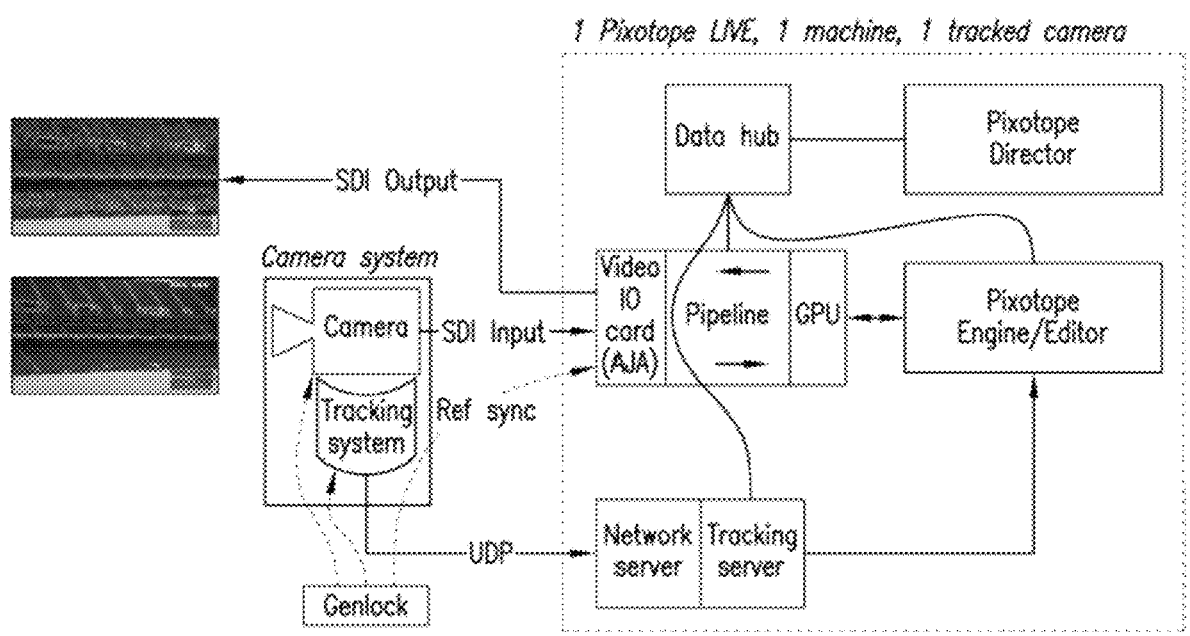
FIG. 6 depicts an overall workflow of a system, according to at least some embodiments disclosed herein.
Figure 7A:
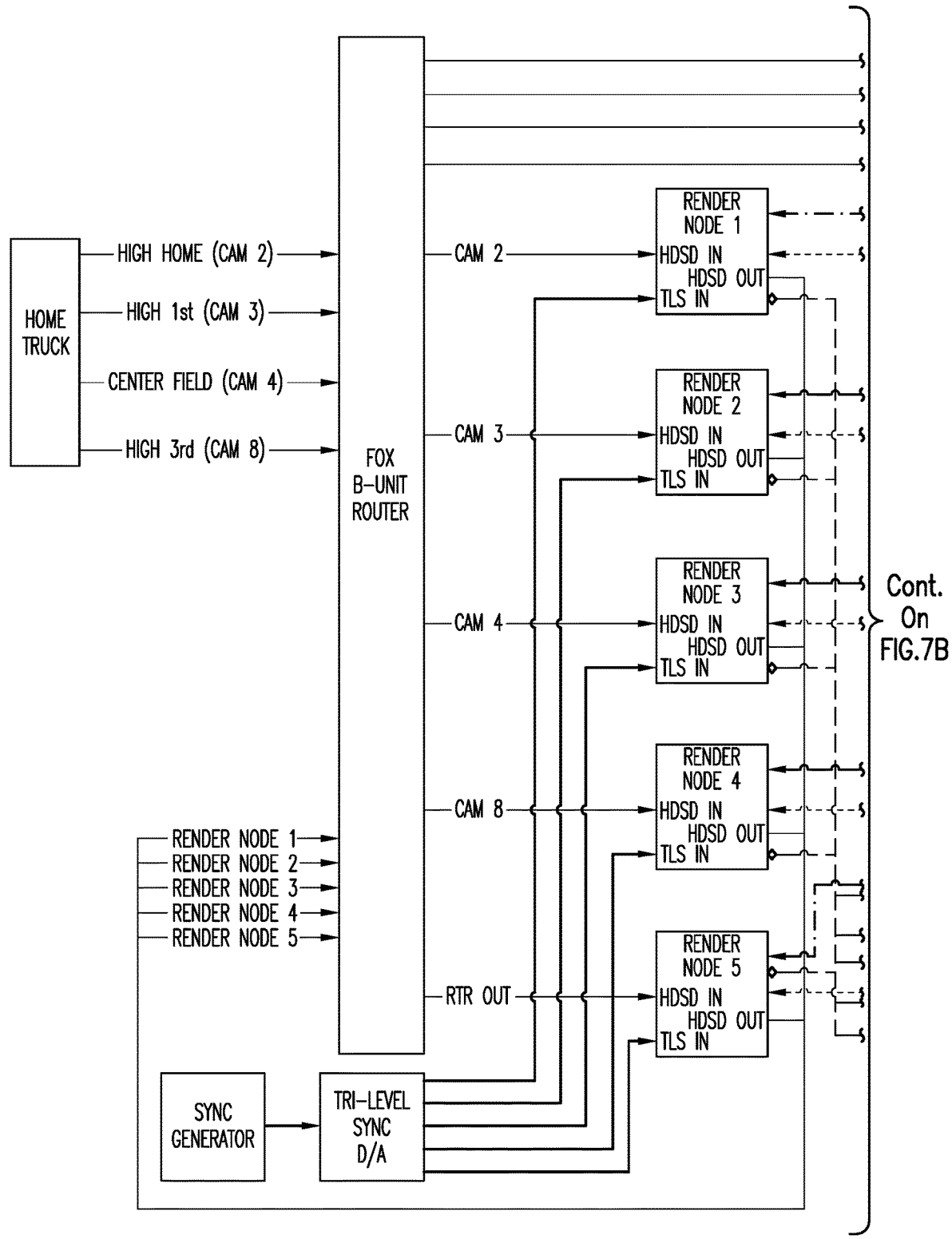
FIG. 7A depicts an overall signal flow of a system, which is continued on FIG. 7B, according to at least some embodiments disclosed herein.
Figure 7B:
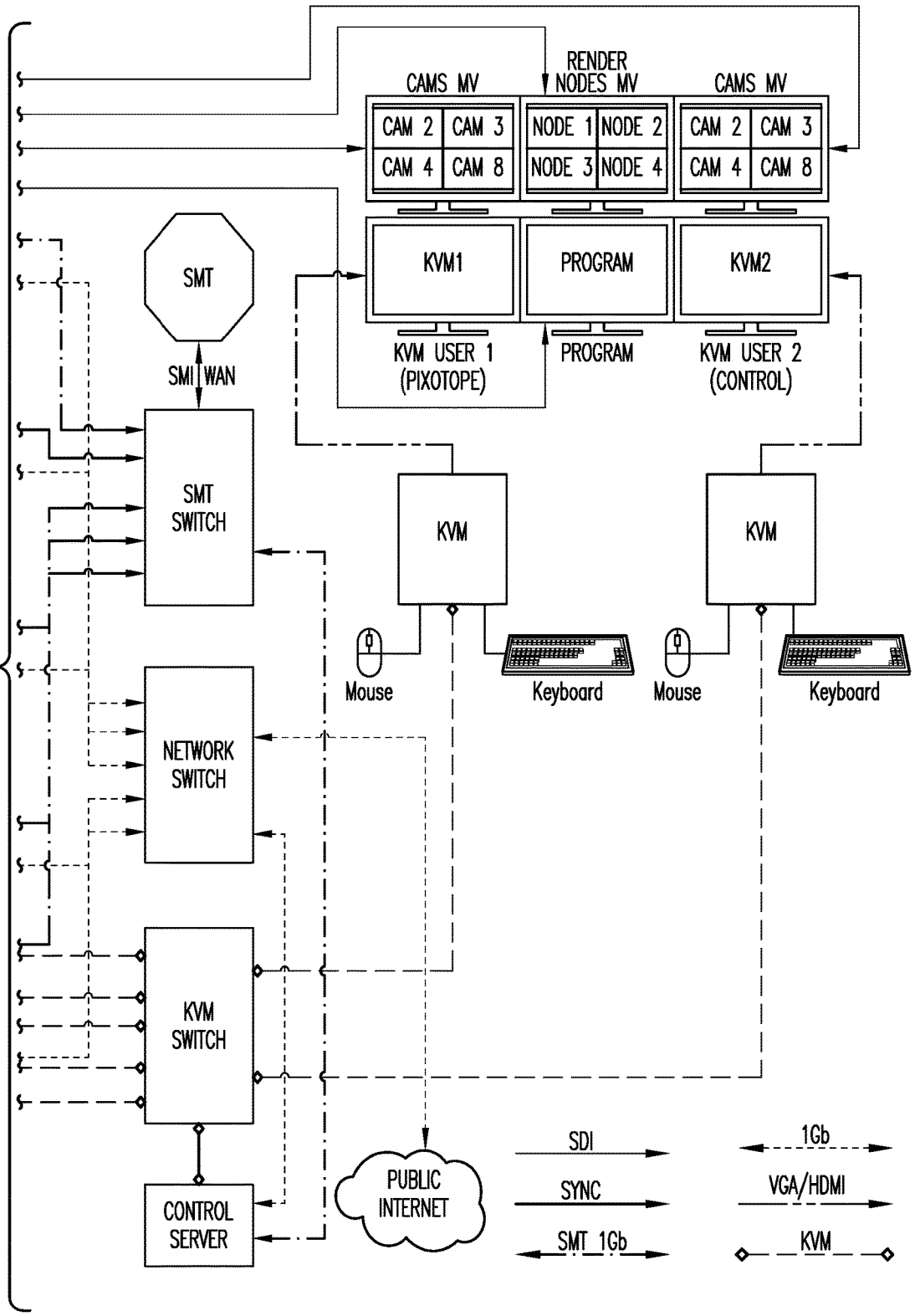
FIG. 7B depicts an overall signal flow of a system, which is continued from FIG. 7A, according to at least some embodiments disclosed herein.

FIG. 6 depicts an overall workflow of a system, according to at least some embodiments disclosed herein. FIG. 7A and FIG. 7B depict an overall signal flow of a system, according to at least some embodiments disclosed herein.

FIG. 6 shows the overall workflow of the system. The system at large is a network of machines that processes and ingests broadcast camera feeds and tracking data (e.g., the data 120) and then leverages a third party AR system for compositing and tracking platform to render tens of thousands of crowd members (e.g., the digital members 128) on top of the live footage 170. It should be appreciated that a quantity of the digital members 128 is not limited to any particular quantity.

FIG. 7 shows the signal flow of the system where virtual fans (e.g., the digital members 128) are inserted into the 3D mapped stadium (e.g., the 3D view 112). FIG. 7 also shows how each local networked machine is set up either as a render node or a control unit accordingly. All render nodes act as slaves to the master control unit, where the control unit can perform the actions of the crowded machine across all local networked machines on the network and monitor each machine's status. The system's tools can sync the latest updates of the project and update the system's tools across all machines.

Figure 8:
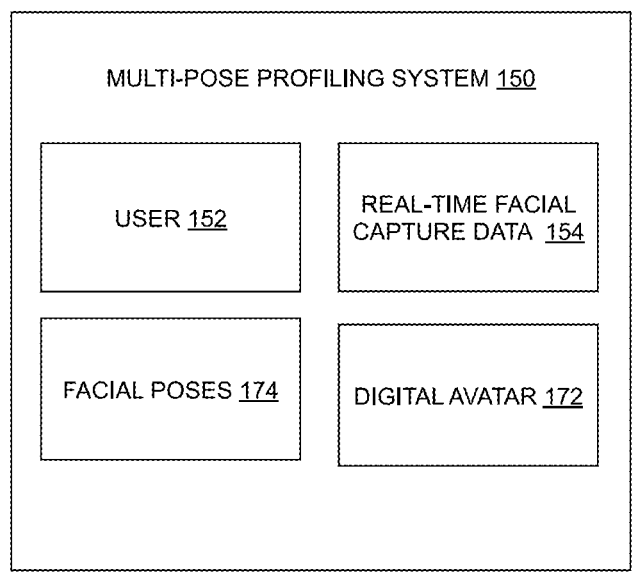
FIG. 8 depicts a block diagram of a multi-pose profiling system for real-time facial performance capture, according to at least some embodiments disclosed herein.
Figure 9:
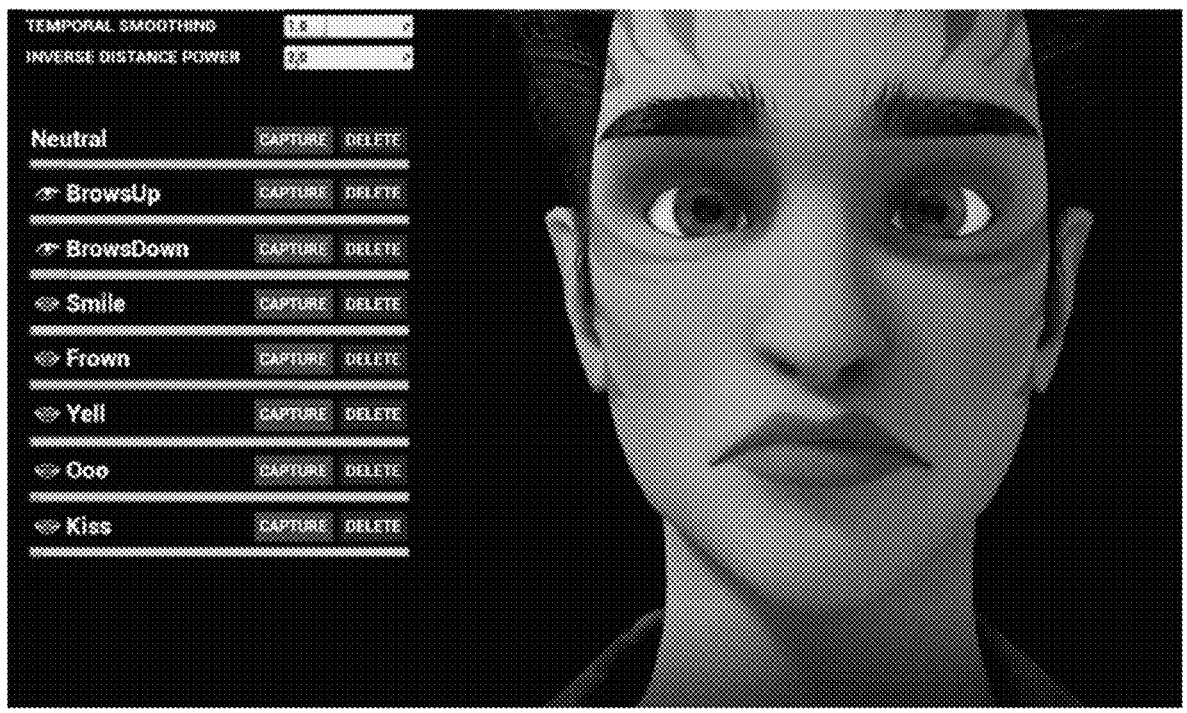
FIG. 9 depicts a graphical representation of a digital avatar of a multi-pose profiling system for real-time facial performance capture, according to at least some embodiments disclosed herein.

FIG. 8 depicts a block diagram of a multi-pose profiling system for real-time facial performance capture, according to at least some embodiments disclosed herein. FIG. 9 depicts a graphical representation of a digital avatar of a multi-pose profiling system for real-time facial performance capture, according to at least some embodiments disclosed herein.

As shown in FIG. 8, the instant invention also provides a multi-pose profiling system 150 for real-time facial performance capture. The multi-pose profiling system 150 can execute a method to provide enhanced processing of real-time facial capture data 154 such that multiple facial poses 174 performed by a user 152 can be adjusted for ideal output on a digital avatar 172, such as the digital avatar 172 shown in FIG. 9. In examples, the input data for the multi-pose profiling system comprises: (1) a continuous stream of the facial poses 174 for the user 152 and (2) the digital avatar 172. Each of the facial poses 174 is a collection of scalar values, representing activations of a set of localized poses of various parts of the human face for the user 152. This input is typically obtained from a facial tracking system, such as ARKit. Further, the digital avatar 172 can perform facial deformations driven by the input pose.

The multi-pose profiling system 150 operates in two modes: (1) a profiling mode and (2) a run-time mode. In the profiling mode, the user 152 performs a neutral pose which is used as the basis for remapping any subsequent input pose, as well as multiple complete reference poses, each of which are designated as either an upper region pose (e.g., eyes, eyebrows, forehead, etc.) or a lower region pose (e.g., cheeks, mouth, nose, chin, etc.). Each pose is captured into the multi-pose profiling system 150, after which the operator 130 is able to adjust the pose using multipliers in order to obtain the desired output on the digital avatar 172.

In the run-time mode, the multi-pose profiling system 150 calculates the weight of each reference pose based on the values of the real-time input pose. Interpolation is performed using inverse distance weighting, treating each pose as an N-dimensional point in space, N being the number of channels the system captures which comprise the facial region of the reference pose.

The multi-pose profiling system 150 multiplies the weights of each reference pose by that reference pose's channel multipliers as defined by the user 152. Furthermore, the multi-pose profiling system 150 applies weighted average exponential smoothing on the input poses, as well as on the weights of the reference poses to mitigate noise in the input signals.

Figure 10:
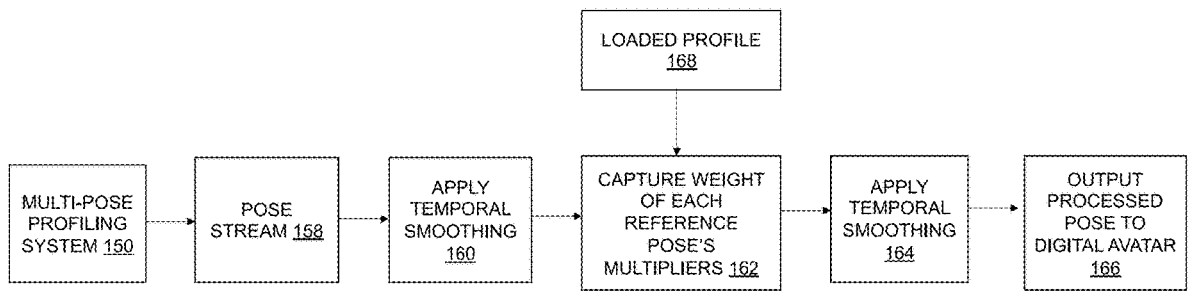
FIG. 10 depicts a schematic diagram of a runtime signal flow of a multi-pose profiling system for real-time facial performance capture, according to at least some embodiments disclosed herein.

FIG. 10 depicts a schematic diagram of a runtime signal flow of a multi-pose profiling system for real-time facial performance capture, according to at least some embodiments disclosed herein. Specifically, the multi-pose profiling system 150 executes multiple process steps. For example, the multi-pose profiling system 150 executes a first process step 158 to receive the pose stream. A second process step 160 follows the first process step 158 and includes the multi-pose profiling system 150 applying temporal smoothing. A third process step 162 follows the second process step 160 and includes the multi-pose profiling system 150 capturing the weight of each reference poses' multipliers. A fourth process step 164 follows the third process step 162 and includes the multi-pose profiling system 150 applying temporal smoothing again. Further, a fifth process step 166 follows the fourth process step 164 and includes the multi-pose profiling system 150 outputting the processed pose to the digital avatar 172. A loaded profile 168 may assist in the third process step 162.

Figure 11:
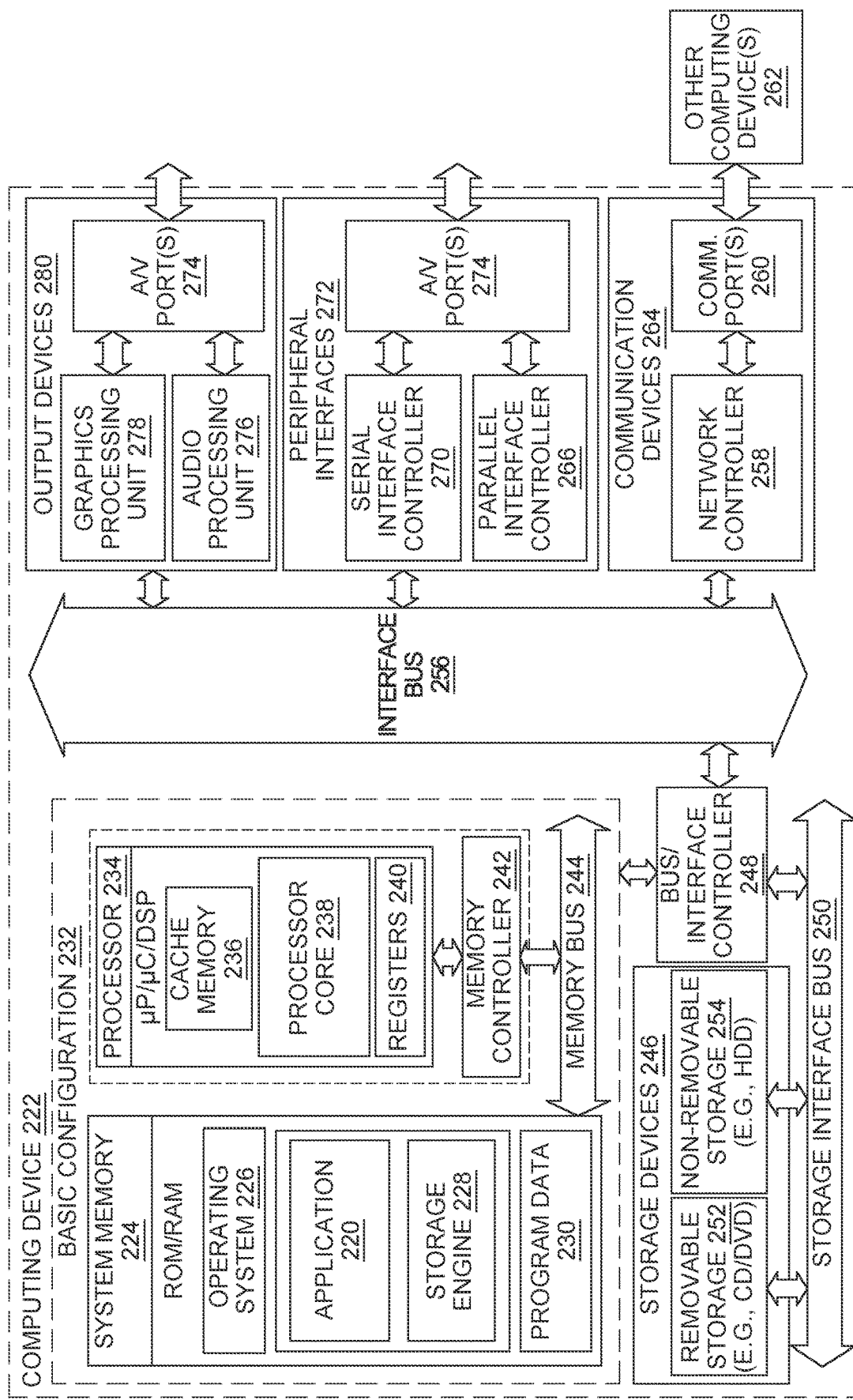
FIG. 11 is a block diagram of a computing device included within a computer system, according to at least some embodiments disclosed herein.

FIG. 11 is a block diagram of a computing device included within the computer system described herein. In some embodiments, the present invention may be a computer system, a method, and/or the computing device 102 (of FIG. 2) or the computing device 222 (of FIG. 11). For example, the computer system and/or the computing device 222 may be utilized to implement a method for rendering virtual or digital crowds in real-time.

A basic configuration 232 of a computing device 222 is illustrated in FIG. 11 by those components within the inner dashed line. In the basic configuration 232 of the computing device 222, the computing device 222 includes a processor 234 and a system memory 224. In some examples, the computing device 222 may include one or more processors and the system memory 224. A memory bus 244 is used for communicating between the one or more processors 234 and the system memory 224.

Depending on the desired configuration, the processor 234 may be of any type, including, but not limited to, a microprocessor (µP), a microcontroller (µC), and a digital signal processor (DSP), or any combination thereof. Further, the processor 234 may include one more levels of caching, such as a level cache memory 236, a processor core 238, and registers 240, among other examples. The processor core 238 may include an arithmetic logic unit (ALU), a floating point unit (FPU), and/or a digital signal processing core (DSP Core), or any combination thereof. A memory controller 242 may be used with the processor 234, or, in some implementations, the memory controller 242 may be an internal part of the memory controller 242.

Depending on the desired configuration, the system memory 224 may be of any type, including, but not limited to, volatile memory (such as RAM), and/or non-volatile memory (such as ROM, flash memory, etc.), or any combination thereof. The system memory 224 includes an operating system 226, an application 220, and program data 230. In some embodiments, the application 220 may be an engine, a software program, a service, or a software platform, as described infra. The system memory 224 may also include a storage engine 228 that may store any information disclosed herein.

Moreover, the computing device 222 may have additional features or functionality, and additional interfaces to facilitate communications between the basic configuration 232 and any desired devices and interfaces. For example, a bus/interface controller 248 is used to facilitate communications between the basic configuration 232 and data storage devices 246 via a storage interface bus 250. The data storage devices 246 may be one or more removable storage devices 252, one or more non-removable storage devices 254, or a combination thereof. Examples of the one or more removable storage devices 252 and the one or more non-removable storage devices 254 include magnetic disk devices (such as flexible disk drives and hard-disk drives (HDD)), optical disk drives (such as compact disk (CD) drives or digital versatile disk (DVD) drives), solid state drives (SSD), and tape drives, among others.

In some embodiments, an interface bus 256 facilitates communication from various interface devices (e.g., one or more output devices 280, one or more peripheral interfaces 272, and one or more communication devices 264) to the basic configuration 232 via the bus/interface controller 256. Some of the one or more output devices 280 include a graphics processing unit 278 and an audio processing unit 276, which are configured to communicate to various external devices, such as a display or speakers, via one or more A/V ports 274.

The one or more peripheral interfaces 272 may include a serial interface controller 270 or a parallel interface controller 266, which are configured to communicate with external devices, such as input devices (e.g., a keyboard, a mouse, a pen, a voice input device, or a touch input device, etc.) or other peripheral devices (e.g., a printer or a scanner, etc.) via one or more I/O ports 268.

Further, the one or more communication devices 264 may include a network controller 258, which is arranged to facilitate communication with one or more other computing devices 262 over a network communication link via one or more communication ports 260. The one or more other computing devices 262 include servers, the database, mobile devices, and comparable devices.

The network communication link is an example of a communication media. The communication media are typically embodied by the computer-readable instructions, data structures, program modules, or other data in a modulated data signal, such as a carrier wave or other transport mechanism, and include any information delivery media. A "modulated data signal" is a signal that has one or more of its characteristics set or changed in such a manner as to encode information in the signal. By way of example, and not limitation, the communication media may include wired media (such as a wired network or direct-wired connection) and wireless media (such as acoustic, radio frequency (RF), microwave, infrared (IR), and other wireless media). The term "computer-readable media," as used herein, includes both storage media and communication media.

It should be appreciated that the system memory 224, the one or more removable storage devices 252, and the one or more non-removable storage devices 254 are examples of the computer-readable storage media. The computer-readable storage media is a tangible device that can retain and store instructions (e.g., program code) for use by an instruction execution device (e.g., the computing device 222). Any such, computer storage media is part of the computing device 222.

The computer readable storage media/medium can be a tangible device that can retain and store instructions for use by an instruction execution device. The computer readable storage media/medium may be, for example, but is not limited to, an electronic storage device, a magnetic storage device, an optical storage device, an electromagnetic storage device, and/or a semiconductor storage device, or any suitable combination of the foregoing. A non-exhaustive list of more specific examples of the computer readable storage media/medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and/or a mechanically encoded device (such as punch-cards or raised structures in a groove having instructions recorded thereon), and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Aspects of the present invention are described herein regarding illustrations and/or block diagrams of methods, computer systems, and computing devices according to embodiments of the invention. It will be understood that each block in the block diagrams, and combinations of the blocks, can be implemented by the computer-readable instructions (e.g., the program code).

The computer-readable instructions are provided to the processor 234 of a general purpose computer, special purpose computer, or other programmable data processing apparatus (e.g., the computing device 222) to produce a machine, such that the instructions, which execute via the processor 234 of the computer or other programmable data processing apparatus, create means for implementing the functions/acts specified in the block diagram blocks. These computer-readable instructions are also stored in a computer-readable storage medium that can direct a computer, a programmable data processing apparatus, and/or other devices to function in a particular manner, such that the computer-readable storage medium having instructions stored therein comprises an article of manufacture including instructions, which implement aspects of the functions/acts specified in the block diagram blocks.

The computer-readable instructions (e.g., the program code) are also loaded onto a computer (e.g. the computing device 222), another programmable data processing apparatus, or another device to cause a series of operational steps to be performed on the computer, the other programmable apparatus, or the other device to produce a computer implemented process, such that the instructions, which execute on the computer, the other programmable apparatus, or the other device, implement the functions/acts specified in the block diagram blocks.

Computer readable program instructions described herein can also be downloaded to respective computing/processing devices from a computer readable storage medium or to an external computer or external storage device via a network (e.g., the Internet, a local area network, a wide area network, and/or a wireless network). The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer/computing device, partly on the user's computer/computing device, as a stand-alone software package, partly on the user's computer/computing device and partly on a remote computer/computing device or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to block diagrams of methods, computer systems, and computing devices according to embodiments of the invention. It will be understood that each block and combinations of blocks in the diagrams, can be implemented by the computer readable program instructions.

The block diagrams in the Figures illustrate the architecture, functionality, and operation of possible implementations of computer systems, methods, and computing devices according to various embodiments of the present invention. In this regard, each block in the block diagrams may represent a module, a segment, or a portion of executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block and combinations of blocks can be implemented by special purpose hardware-based systems that perform the specified functions or acts or carry out combinations of special purpose hardware and computer instructions.

Another embodiment of the invention provides a method that performs the process steps on a subscription, advertising, and/or fee basis. That is, a service provider can offer to assist in the method steps for rendering virtual or digital crowds in real-time. In this case, the service provider can create, maintain, and/or support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

When introducing elements of the present disclosure or the embodiments thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A system for rendering virtual or digital crowds in real-time, the system comprising:
   a computing device comprising at least an application, a memory, a storage device and a graphical user interface (GUI), wherein the application is configured to:
   map a venue of a first location hosting an event in a three-dimensional (3D) view;
   receive data from one or more cameras in a second location, wherein the data comprises tracking data of one or more users in the second location;
   process the data; and
   transmit the processed data to an augmented reality system;
   the augmented reality system, being configured to:
   receive the processed data;
   combine the processed data with additional data to form digital crowd members; and
   place the digital crowd members into the 3D view of the venue by;
   dividing the venue into sections;
   configuring the sections to have a specified number of rows of seats, a specified distance between rows; a specified distance between seats, and specified row offsets;
   placing the tagged and configured venue sections using section placing modes including at least one of grid, quad, and spline modes; and
   eliminating seats in the placed venue sections that do not have venue geometry beneath them;
   tagging each of the venue sections to create positions into which the digital crowd members can be spawned;
   replicating each of the sections in a 3D environment to create the 3D view;
   spawning the digital crowd members into the tagged positions; and
   receiving data from an operator via the GUI to manipulate the digital crowd members; and
   a transmission control protocol (TCP) network configured to propagate commands of the operator to render machines in real-time.

2. The system of claim 1, configured for use in a stadium or a sporting arena.

3. The system of claim 1, wherein the mapping of the venue in the 3D view occurs via a light detection and ranging (LiDar) remote sensing method.

4. The system of claim 1, wherein the digital crowd members are populated into the 3D view of the venue on top of live footage occurring in the venue.

5. The system of claim 1, wherein the augmented reality system is further configured to:
   utilize a geographically accurate sunlight simulation system to illuminate the digital crowd members based on the geo-coordinates of the venue and a current date and time.

6. The system of claim 1, wherein the digital crowd members comprise factors customizable by the operator.

7. The system of claim 6, wherein each of the factors are selected from the group consisting of:
   clothing of the digital crowd members,
   logos on the clothing of the digital crowd members,
   skin color of the digital crowd members,
   skin tone of the digital crowd members,
   gender of the digital crowd members,
   hair styles of the digital crowd members,
   hair length of the digital crowd members,
   hair color of the digital crowd members,
   height of the digital crowd members,
   animations associated with the digital crowd members,
   a ratio of fans associated with a first team as compared to a second team of the digital crowd members,
   a percentage of empty seats in the venue associated with the first location, and
   a gender ratio of the digital crowd members.

8. The system of claim 7, wherein the animations are selected from the group consisting of:
   a sitting animation,
   a standing animation,
   a cheering animation,
   a booing animation, and
   a watching animation.

9. The system of claim 1, wherein:
   the digital crowd members comprise a first set of fans of a first team, a second set of fans of a second team, and a third set of fans of neither the first team nor the second team, and the first team and the second team are associated with the event being held at the venue.

10. The system of claim 1, wherein the GUI is engaged by the operator to respond to the event in real-time.

11. The system of claim 10, wherein the response to the event in real-time are selected from the group consisting of:
    a customization of one or more animations for one or more of the digital crowd members,
    a customization of lighting for the venue at the first location,
    a customization of a weather event for the venue at the first location, and
    a movement for one or more of the digital crowd members.

12. The system of claim 1, wherein the positions comprise seats in the venue.

13. The system of claim 1, wherein the GUI is engaged by the operator to modify a geometry of the venue.

14. A method executed by a system for rendering virtual or digital crowds in real-time, the method comprising:
    mapping, via a processor of a computing device via a light detection and ranging (LiDar) remote sensing method, a venue of a first location hosting an event in a three-dimensional (3D) view, wherein the venue comprises a stadium or a sporting arena;
    receiving, by the processor, data from one or more cameras in a second location, wherein the data comprises tracking data of one or more users in the second location;
    processing, by the processor, the data;
    transmitting, by the processor, the processed data to an augmented reality system;
    receiving, by the augmented reality system, the processed data;
    combining, by the augmented reality system, the processed data with additional data to form digital crowd members;
    placing, by the augmented reality system, the digital crowd members into the 3D view of the venue by:
    dividing the venue into sections;
    configuring the sections to have a specified number of rows of seats, a specified distance between rows; a specified distance between seats, and specified row offsets;

placing the tagged and configured venue sections using section placing modes including at least one of grid, quad, and spline modes; and eliminating seats in the placed venue sections that do not have venue geometry beneath them;

tagging each of the venue sections to create positions into which the digital crowd members can be spawned;

replicating each of the sections in a 3D environment to create the 3D view; and spawning the digital crowd members into the tagged positions; and engaging, by an operator, a graphical user interface (GUI) of the computing device to manipulate the digital crowd members; and propagating, by a transmission control protocol (TCP) network, commands of the operator to render machines in real-time.

15. The method of claim 14, wherein the digital crowd members are populated into the 3D view of the venue on top of live footage occurring in the venue.

16. The method of claim 14, further comprising:
utilizing, via the augmented reality system, a geographically accurate sunlight simulation system to illuminate the digital crowd members based on the geo-coordinates of the venue and a current date and time.

17. The method of claim 14, further comprising:
customizing, by the operator, one or more factors of one or more of the digital crowd members, wherein each of the factors are selected from the group consisting of:
clothing of the digital crowd members,
logos on the clothing of the digital crowd members,
skin color of the digital crowd members,
skin tone of the digital crowd members,
gender of the digital crowd members,
hair styles of the digital crowd members,
hair length of the digital crowd members,
hair color of the digital crowd members,
height of the digital crowd members,
animations associated with the digital crowd members,
a ratio of fans associated with a first team as compared to a second team of the digital crowd members,
a percentage of empty seats in the venue associated with the first location, and
a gender ratio of the digital crowd members, wherein the animations are selected from the group consisting of:
a sitting animation,
a standing animation,
a cheering animation,
a booing animation, and
a watching animation.

18. A computer system comprising:
one or more processors;
one or more memories; and
one or more computer-readable hardware storage devices, wherein the one or more computer-readable hardware storage devices contain program code executable by the one or more processors via the one or more memories to implement a method for rendering virtual or digital crowds in real-time, the method comprising:
mapping, via a light detection and ranging (LiDar) remote sensing method, a venue of a first location hosting an event in a three-dimensional (3D) view, wherein the venue comprises a stadium or a sporting arena;
receiving data from one or more cameras in a second location, wherein the data comprises tracking data of one or more users in the second location;
processing the data;
transmitting the processed data to an augmented reality system, wherein the augmented reality system is configured to:
receive the processed data;
combine the processed data with additional data to form digital crowd members; and
place the digital crowd members into the 3D view of the venue by:
dividing the venue into sections;
configuring the sections to have a specified number of rows of seats, a specified distance between rows; a specified distance between seats, and specified row offsets;
placing the tagged and configured venue sections using section placing modes including at least one of grid, quad, and spline modes; and
eliminating seats in the placed venue sections that do not have venue geometry beneath them;
tagging each of the venue sections to create positions into which the digital crowd members can be spawned;
replicating each of the sections in a 3D environment to create the 3D view;
spawning the digital crowd members into the tagged positions; and
engaging, by an operator, a graphical user interface (GUI) to manipulate the digital crowd members; and
propagating, by a transmission control protocol (TCP) network, commands of the operator to render machines in real-time.

* * * * *